(12) United States Patent
Mech et al.

(10) Patent No.: US 7,878,868 B2
(45) Date of Patent: Feb. 1, 2011

(54) MULTIPURPOSE CABLE CONNECTOR

(75) Inventors: Konrad Mech, North Vancouver (CA); Andre Mech, Mississauga (CA); Brian Spira, Edmonton (CA); Jeff Dumanowski, South West Edmonton (CA)

(73) Assignee: Drexan Energy Systems Inc., Burnaby (CA)

( * ) Notice: Subject to any disclaimer, the term of this patent is extended or adjusted under 35 U.S.C. 154(b) by 0 days.

(21) Appl. No.: 12/810,489

(22) PCT Filed: Dec. 23, 2008

(86) PCT No.: PCT/CA2008/002278

§ 371 (c)(1),
(2), (4) Date: Jun. 24, 2010

(87) PCT Pub. No.: WO2009/082815

PCT Pub. Date: Jul. 9, 2009

(65) Prior Publication Data

US 2010/0285678 A1 Nov. 11, 2010

(30) Foreign Application Priority Data

Dec. 28, 2007 (CA) .................................. 2616498

(51) Int. Cl.
*H01R 9/22* (2006.01)
(52) U.S. Cl. .................. 439/709; 439/607.41; 439/786; 439/101
(58) Field of Classification Search .................. 439/101, 439/607.41, 709, 786, 787
See application file for complete search history.

(56) References Cited

U.S. PATENT DOCUMENTS

| 4,153,326 | A | 5/1979 | Frantz et al. |
| 4,388,523 | A | 6/1983 | Keep et al. |
| 4,575,617 | A | 3/1986 | Cooper |
| 4,801,783 | A | 1/1989 | Milroy |
| 4,883,945 | A | 11/1989 | Bautista |

(Continued)

FOREIGN PATENT DOCUMENTS

EP 1039606 B1 10/2003

(Continued)

*Primary Examiner*—Tho D Ta
(74) *Attorney, Agent, or Firm*—Oyen Wiggs Green & Mulata LLP (57) ABSTRACT

A cable connector assembly comprising an insulating block defining a plurality of cable receiving channels therein. Each cable receiving channel has an entrance at a periphery of the insulating block. A plurality of ground connectors are coupled to the insulating block and positioned such that a ground connector is located proximate to the entrance of each cable receiving channel. Each ground connector comprises a U-shaped member for engaging a ground braid of a heating cable and a grounding screw for engaging a ground wire of a power cable. A ground linking structure electrically connects the plurality of ground connectors. A plurality of first and second wire connectors are adjustably coupled to the insulating block and positioned such that a first wire connector is selectively extendible into a first side of each cable receiving channel and a second wire connector is positioned to selectively extend into a second side of each cable receiving channel. First and second wire linking structures electrically connect the plurality of first wire connectors and the plurality of second wire connectors, respectively. The first and second wire linking structures may comprise leaf springs.

15 Claims, 9 Drawing Sheets

U.S. PATENT DOCUMENTS

| | | |
|---|---|---|
| 5,086,836 A | 2/1992 | Barth et al. |
| 5,145,388 A | 9/1992 | Brownlie et al. |
| 5,390,961 A | 2/1995 | Guthrie |
| 5,718,600 A | 2/1998 | D'Amario, Jr. et al. |
| 5,756,972 A | 5/1998 | Vranicar et al. |
| 5,818,012 A | 10/1998 | Maniero |
| 6,039,611 A | 3/2000 | Yang |
| 6,680,465 B2 | 1/2004 | O'Connor |
| 6,790,075 B1 | 9/2004 | Sung |
| 7,048,591 B1 * | 5/2006 | Chiang ............... 439/709 |
| 7,110,534 B1 * | 9/2006 | Mullaney et al. ........ 439/709 |
| 7,285,019 B2 * | 10/2007 | Sakai et al. ............. 439/709 |
| 7,338,330 B2 * | 3/2008 | Lopez et al. ............ 439/709 |
| 2006/0228947 A1 * | 10/2006 | Landis et al. ........... 439/610 |

FOREIGN PATENT DOCUMENTS

| | | |
|---|---|---|
| EP | 1622424 A1 | 2/2006 |
| WO | 9905756 A1 | 2/1999 |

* cited by examiner

MULTIPURPOSE CABLE CONNECTOR

TECHNICAL FIELD

The invention relates to cable connectors. Certain embodiments of the invention have particular application for use with heating cables.

BACKGROUND

Electric heating cables, sometimes referred to as "heat tracing" or "heat tape" are used for a number of applications, including regulating the temperature of pipes and providing under floor heating. Some such cables comprise two bus wires surrounded by a semi-conductive polymer. When an electric potential is applied across the bus wires, current flows through the polymer, which causes the polymer to heat up. The polymer is typically surrounded by an inner jacket, which is in turn surrounded by a grounding braid. The grounding braid is typically surrounded by an outer jacket. Other types of heating cables, sometimes referred to as "zone heaters", have a pair of insulated bus wires with a heating element wrapped around them, which is in turn surrounded by an inner jacket, braid, and outer jacket.

It can be difficult and time consuming to establish safe and robust electrical connections between a heating cable a power cable, or between two heating cables. There exist a number of prior art systems which are aimed at aiding users in making such connections, including Tyco Thermal Controls LLC's RayClic™ system (aspects of which are disclosed in U.S. Pat. No. 5,756,972), and Heat Trace Limited's StripFree™ system.

The inventors have determined a need for improved systems for establishing electrical connections between cables.

SUMMARY

The following embodiments and aspects thereof are described and illustrated in conjunction with systems, tools and methods which are meant to be exemplary and illustrative, not limiting in scope.

One aspect of the invention provides a cable connector assembly comprising an insulating block defining a plurality of cable receiving channels therein. Each cable receiving channel has an entrance at a periphery of the insulating block. A plurality of ground connectors are coupled to the insulating block and positioned such that a ground connector is located proximate to the entrance of each cable receiving channel. Each ground connector comprises a U-shaped member for engaging a ground braid of a heating cable and a grounding screw for engaging a ground wire of a power cable. A ground linking structure electrically connects the plurality of ground connectors. A plurality of first and second wire connectors are adjustably coupled to the insulating block and positioned such that a first wire connector is selectively extendible into a first side of each cable receiving channel and a second wire connector is positioned to selectively extend into a second side of each cable receiving channel. First and second wire linking structures electrically connect the plurality of first wire connectors and the plurality of second wire connectors, respectively. The first and second wire linking structures may comprise leaf springs.

Further aspects of the invention and details of example embodiments are described below.

BRIEF DESCRIPTION OF DRAWINGS

In drawings which illustrate non-limiting embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Embodiments of the invention described herein provide users with easy and efficient mechanisms for making safe and robust electrical connections between or among two or more heating and power cables. In some embodiments, the same cable connector assembly may be used to connect:

a power cable and a heating cable;
two heating cables;
two power cables;
a power cable and two heating cables;
a heating cable and two power cables;
three heating cables;
three power cables;
a power cable and three heating cables;

a heating cable and three power cables;
four heating cables; or,
four power cables.

FIGS. 1-7 show a cable connector assembly 10 according to one embodiment. Cable connector assembly 10 comprises a housing 12 having two end caps 14 coupled to threaded portions 13 extending from opposite ends of housing 12. A top panel 16T is coupled to an upper side of housing 12, and a bottom panel 16B is coupled to a lower side of housing 12, by screws 15. Sealing members 18 may be provided between top and bottom panels 16T and 16B and housing 12 to ensure tight seals therebetween.

Mounting features 19 are provided on the underside of bottom panel 16B of cable connector assembly 10. Mounting features 19 facilitate mounting of assembly 10 on a supporting structure (not shown), and are preferably sized such that there is sufficient room for a user to tighten and loosen end caps 14 when assembly 10 is mounted on the supporting structure. In the illustrated embodiment, mounting features 19 are configured to accommodate straps or the like (not shown) for mounting assembly 10 to a pipe (not shown), but one skilled in the art will appreciate the mounting features 19 could take different forms for mounting assembly 10 to different structures.

Figures 1, 2, 3:
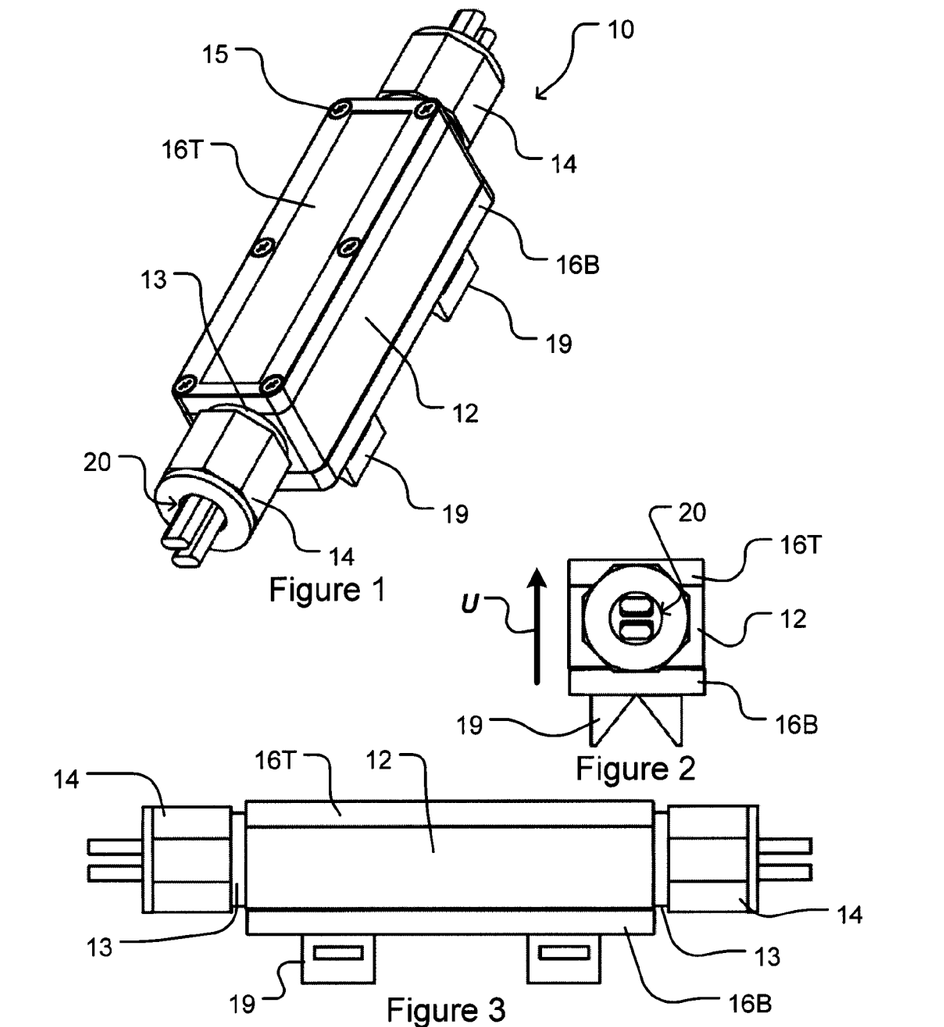
FIG. 1 shows a cable connector assembly according to one embodiment of the invention.
FIG. 2 is an end view of the cable connector assembly of FIG. 1.
FIG. 3 is a side view of the cable connector assembly of FIG. 1.
Figure 4:
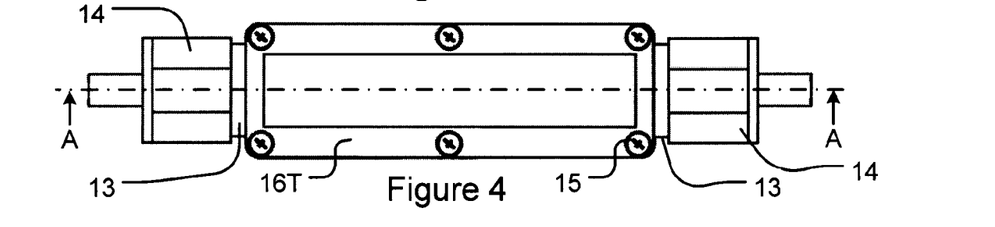
FIG. 4 is a top view of the cable connector assembly of FIG. 1.

The terms "top", "up", and the like are used herein to refer to the direction indicated by arrow U in FIG. 2, which is generally away from the structure on which assembly 10 is mounted. Likewise, the terms "bottom", "down" and the like are used to refer to the opposite direction. As one skilled in the art will appreciate, assembly 10 may be mounted in any orientation, such that the "top" of assembly 10 could be facing the ground (or in any other direction).

Figure 5:
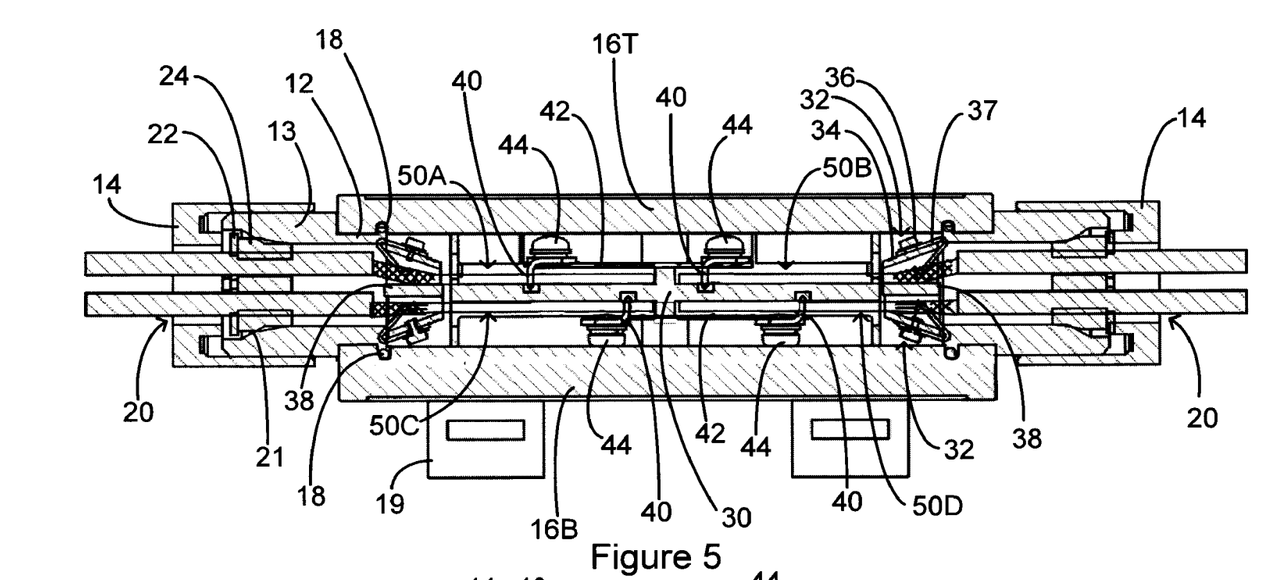
FIG. 5 is a sectional view taken along line A-A of FIG. 4.
Figure 7:
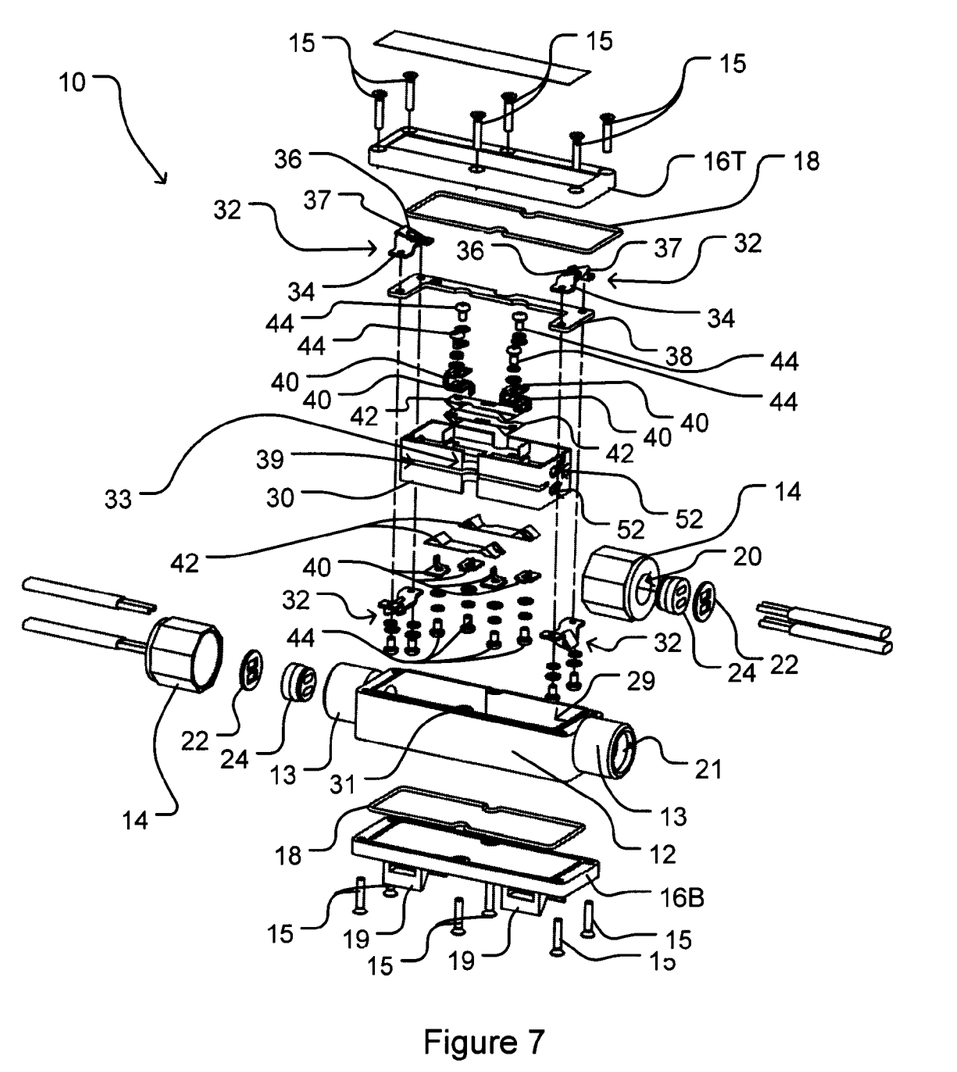
FIG. 7 is an exploded view of the cable connector assembly of FIG. 1.

End caps 14 are configured to retain washers 22 and grommets 24 within threaded portions 13. Each end cap 14 defines an aperture 20 therein which is sized smaller than washer 22 and grommet 24. Each threaded portion 13 comprises a tapered portion 21, such that when end cap 14 is threaded onto threaded portion 13, washer 22 and grommet 24 are held between end cap 14 and tapered portion 21. Grommets 24 may be made from a compressible material, so that when end caps 14 are tightened onto threaded portions 13, grommets 24 form seals with threaded portions 13 and the heating and/or power cable(s).

Each washer 22 and grommet 24 defines at least one cable aperture therein. In the illustrated embodiment, the cable apertures may comprise power cable apertures 26, which are generally circular to conform to the outer jacket of a power cable, and/or heating cable apertures 28, which are generally orotund to conform to the outer jacket of a heating cable. In the other embodiments, cable apertures with different shapes can be provided to accommodate other types of cable having different cross sections. The number and type of cable apertures is determined by the number and type of cables to be connected by cable connector assembly 10.

The cable apertures may be positioned to correspond with cable receiving channels 50 defined in an insulating block 30 received in housing 12, as discussed further below. The cable apertures may or may not be aligned with channels 50. Alignment of cable apertures and channels 50 is not required due to the flexibility of the cables to be received in channels 50.

A plurality of washers 22 and grommets 24 with a variety of cable aperture configurations may be provided, in order to allow a user to establish a variety of cable connections with cable connector assembly 10. FIGS. 8A-8E show a variety of example washers 22 and grommets 24.

In some embodiments, the inner surface of threaded portions 13 may also be threaded. In such embodiments, a rigid or flexible conduit or a Tack cable could be threadedly received by the inner threads of a threaded portion 13 without the use of a washer or grommet.

Insulating block 30 is sized and shaped to be received within a cavity 29 defined in housing 12. Housing 12 may comprise one or more protrusions 31 which extend into cavity 29, and insulating block 30 may define one or more corresponding indentations 33 to ensure proper positioning of block 30 within housing 12. In some embodiments, block 30 may be symmetrical about horizontal and vertical planes of symmetry bisecting block 30. Such a configuration avoids the need for a user to insert block 30 into cavity 29 in a particular orientation, since all orientations in which block 30 fits into cavity 29 are equivalent.

Figure 6:
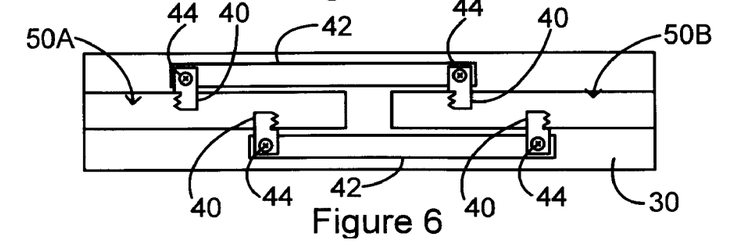
FIG. 6 illustrates the relative positions of wire connectors and leaf springs with respect to cable receiving channels on an upper side of the block of the cable connector assembly of FIG. 1.

Insulating block 30 defines a plurality of cable receiving channels 50 therein. Each channel 50 has an entrance 52 which is located at a periphery of block 30. In some embodiments, four cable receiving channels 50A-D are defined in insulating block 30, with channels 50A and 50B located in an upper portion of block 30 and channels 50C and 50D located in a lower portion of block 30.

A ground connector 32 is positioned near the entrance 52 of each channel 50. In the illustrated embodiment, each ground connector 32 comprises a U-shaped member 34 positioned to contact the ground braid of a heating cable, and a grounding screw 36 positioned to receive a ground wire of a power cable. Grounding screw 36 may have an enlarged head to facilitate attachment of a ground wire, and may have a length selected so as to prevent contact with a ground braid inserted under U-shaped member 34, to avoid damaging the braid. Each ground connector 32 may also comprise a flat spring 37 coupled to U-shaped member 34 for ensuring good electrical contact between the ground braid of a heating cable and ground connector 32. In the illustrated embodiment, flat springs 37 are coupled to U-shaped members 34 by grounding screws 36.

Ground connectors 32 are electrically connected to each other by a ground linking structure. In the illustrated embodiment, the ground linking structure comprises a ground bar 38 to which U-shaped members 34 are attached using screws and washers (not specifically enumerated). Ground bar 38 is inserted into a slot 39 defined in block 30.

A pair of wire connectors 40 are adjustably coupled to block 30 on either side of each cable receiving channel 50. Each wire connector 40 comprises one or more teeth positioned to be selectively extended into one side of channel 50, such that the teeth penetrate insulation of a heating cable received in channel 50 and make electrical contact with a bus wire of the heating cable. A spacing device may also be provided, as discussed below, to position wires of a power cable to be contacted by teeth of wire connectors 40.

Wire connectors 40 are biased away from channels 50 by leaf springs 42 such that the teeth of wire connectors 40 do not extend into channels 50 until wire connector screws 44 are tightened. Wire connectors 40 may be guided by walls (not specifically enumerated) formed by block 30 which maintain the orientations of wire connectors 40 as screws 44 are tightened or loosened. Leaf springs 42 are compressed in the view shown in FIG. 5. Each leaf spring 42 also provides an electrical connection between corresponding wire connectors 40 of different cable receiving channels 50. FIG. 6 shows the positions of wire connectors 40, leaf springs 42 and wire connector screws 44 relative to channels 50A and 50B on the upper side of block 30 in an example embodiment.

Leaf springs 42 are preferably flexible enough that one of the two wire connectors contacted by a leaf spring 42 may be forced into channel 50 by a tightened screw 44, and the other wire connector 40 may be allowed to ride up a loosened screw 44 such that the teeth are clear of a cable path in channel 50, while corresponding surfaces both wire connectors 40 remain generally parallel to one another.

Figure 8A:
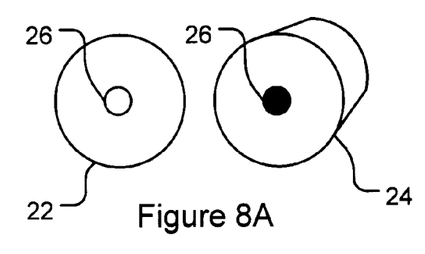
FIGS. 8A-E show a plurality of grommets and washers which may be used with the cable connector assembly of FIGS. 1-7.
Figure 8B:
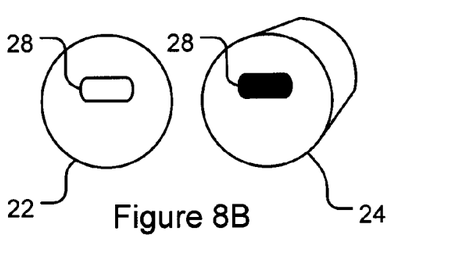
Figure 8C:
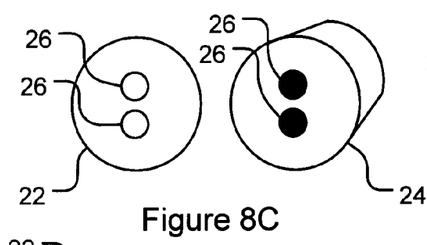
Figure 8D:
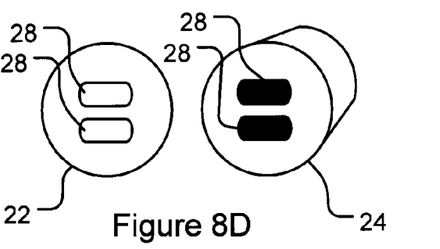
Figures 8E, 9:
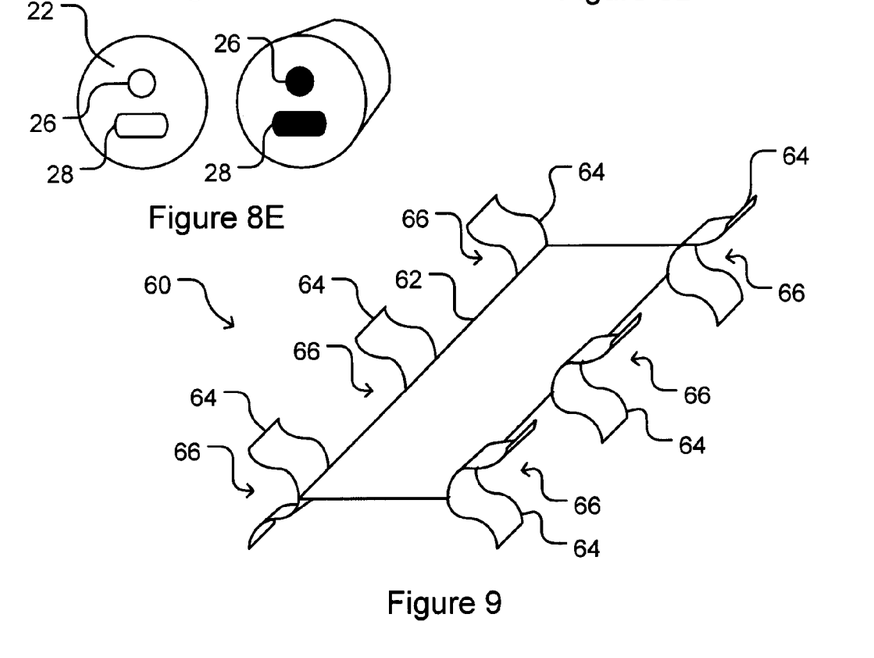
FIG. 9 shows a spacer which may be used with the cable connector assembly of FIGS. 1-7.
Figure 10:
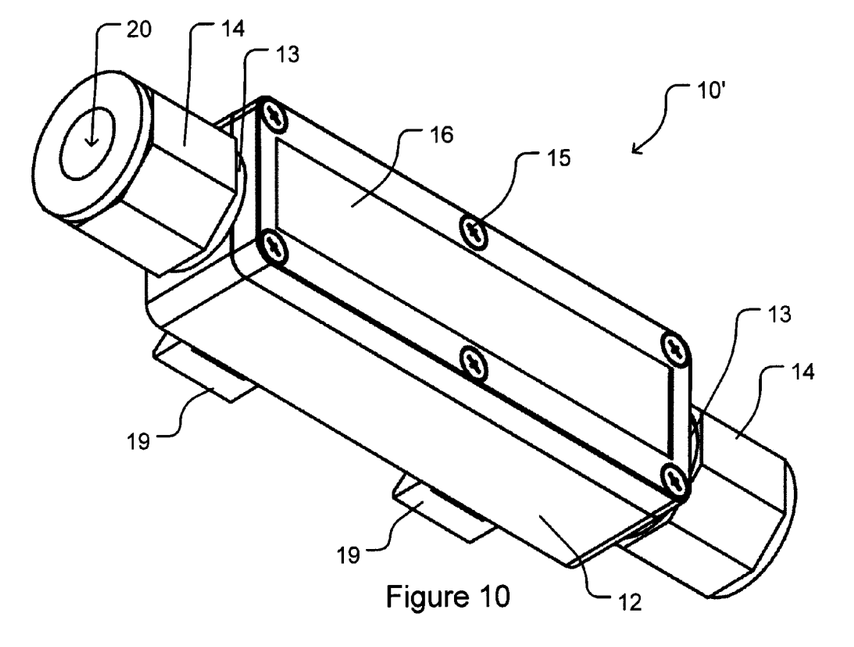
FIG. 10 shows a cable connector assembly according to another embodiment of the invention.
Figure 11:
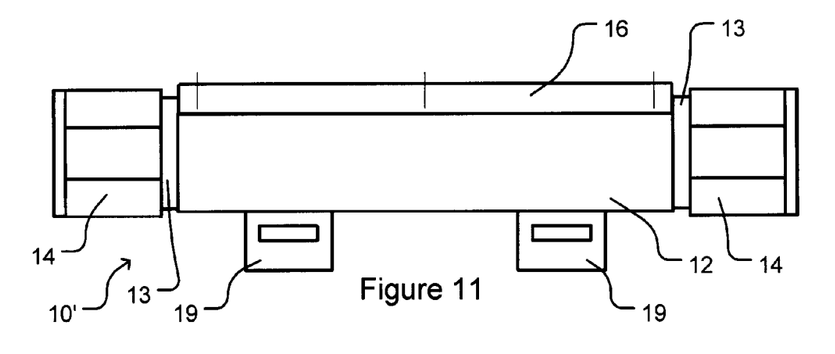
FIG. 11 is a side view of the cable connector assembly of FIG. 10.
Figure 12:
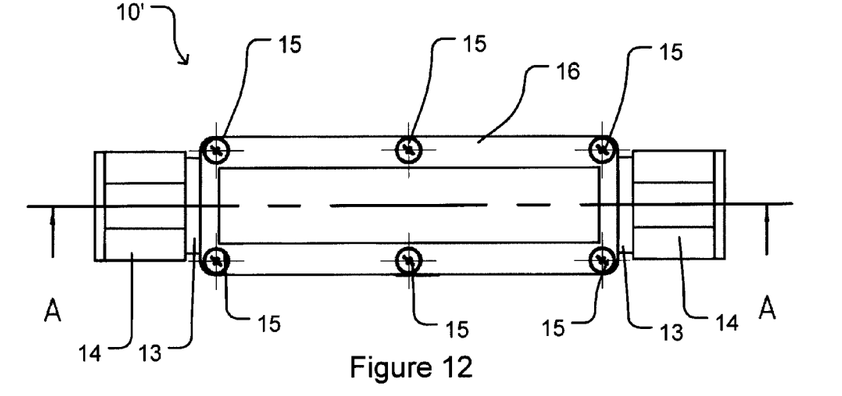
FIG. 12 is a top view of the cable connector assembly of FIG. 10.
Figure 13:
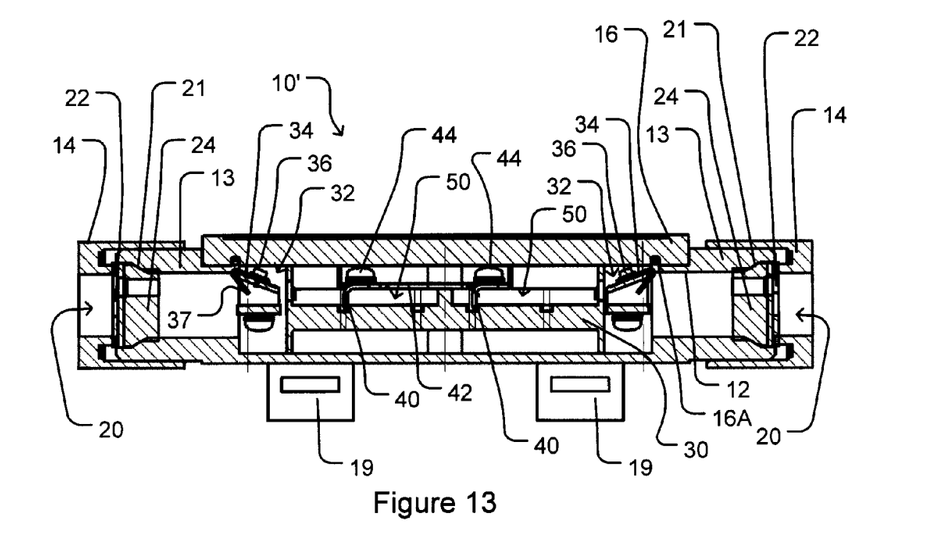
FIG. 13 is a sectional view taken along line A-A of FIG. 12.

Wire connector screws 44 may be positioned to receive wires of a power cable. Alternatively, the wires of a power cable may be coupled to a spacing device which holds the wires in predetermined positions in a cable receiving channel 50, such that the teeth of wire connectors 40 make electrical contact with the wires of the power cable when wire connector screws 44 are tightened. FIG. 9 shows an example spacer 60 according to one embodiment of the invention. Spacer 60 comprises a body 62 and a plurality of protrusions 64. In the illustrated embodiment protrusions 64 are U-shaped to define wire cradles 66. Body 62 and protrusions 64 may have thicknesses on the order of 1 millimeter in some embodiments.

As a further alternative, a user may strip two wires of a cable and establish an electrical connection between the stripped portions of the wires and flat portions of wire connectors 40. The flat portions of wire connectors 40 may be perpendicular to the teeth of wire connectors 40 in some embodiments.

In the illustrated embodiment, each wire connector screw 44 extends through apertures defined in:
 a wire connector 40;
 a leaf spring 42; and,
 block 30.

The apertures in block 30 may comprise threaded conductors which extend from the upper side to the lower side of block 30, in order to provide an electrical connection between corresponding screws 44 on the upper side and the lower side of block 30. As one skilled in the art will appreciate, other mechanisms for establishing electrical connections between corresponding wire connectors on the upper and lower sides of block 30 are also possible. For example, a jumper wire may be attached under screws 44 on the upper and lower sides of block 30, and either pass through a hole through block 30 or wrap around the outside of block 30. Alternatively, a wire bus made from flat spring metal could be connected between screws 44 on the upper and lower sides of block 30 and wrap around the outside of block 30.

FIGS. 10 to 13 show a cable connector assembly 10' according to another embodiment of the invention. Cable connector assembly 10' of FIGS. 10 to 13 is similar to the embodiment of FIGS. 1 to 7, except that only two cable receiving channels 50 and associated hardware are provided, and there is no removable bottom panel. Reference numerals used in FIGS. 10 to 13 generally correspond with those described above with respect to the embodiment of FIGS. 1 to 7. Accordingly, cable connector assembly 10' will not be described further to avoid repetition.

FIGS. 14 to 18 show a cable connector assembly 110 according to another embodiment of the invention. Cable connector assembly 110 comprises an insulating block 130 defining a plurality of cable receiving channels 150 therein. Four channels 150 are provided in the illustrated embodiment. In the illustrated embodiment, insulating block 130 is configured to be received in an enclosure (not shown) having a puck-like shape. In other embodiments, differently shaped insulating blocks may be provided for use with enclosures having different shapes. In some embodiments, the enclosure may comprise a metallic or polymeric junction box.

Figure 14:
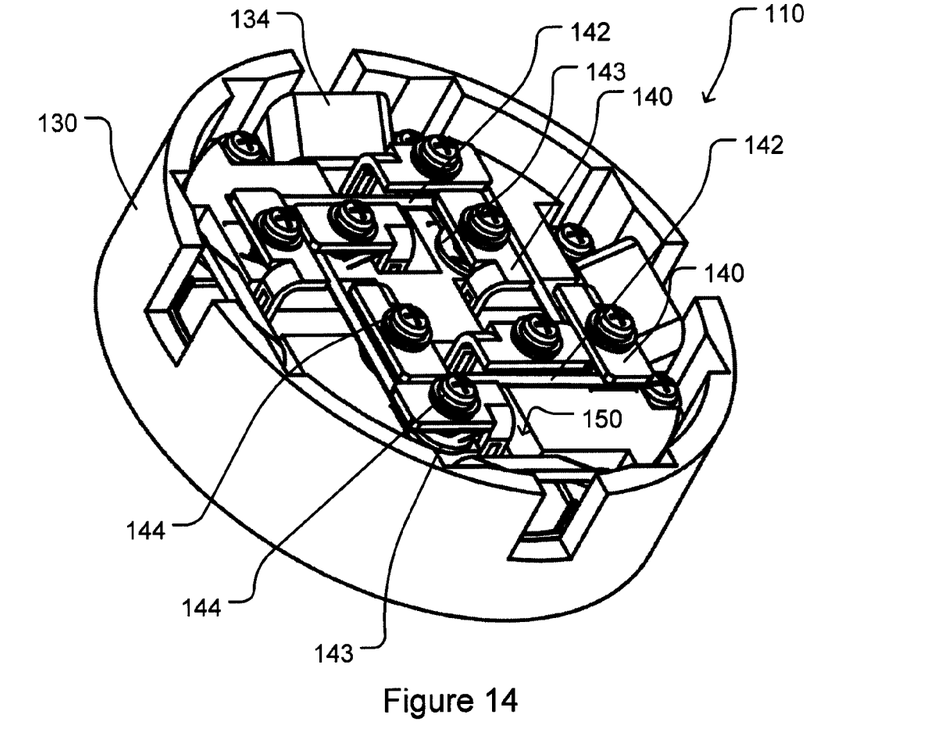
FIG. 14 shows a cable connector assembly according to another embodiment of the invention.
Figure 15:
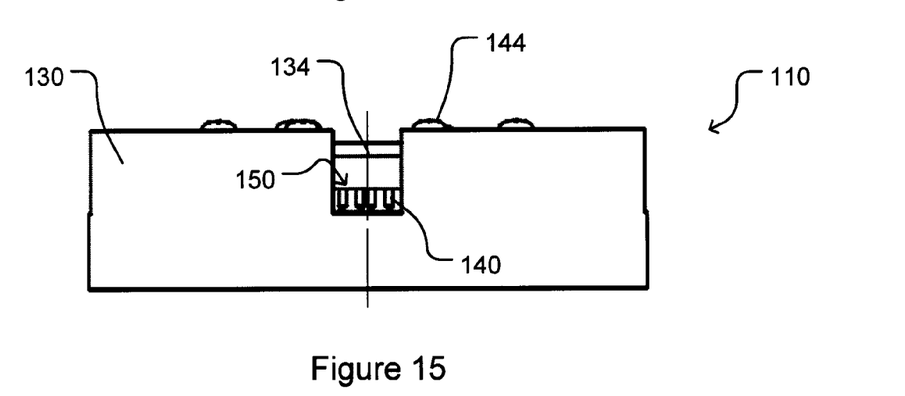
FIG. 15 is a side view of the cable connector assembly of FIG. 14.
Figure 16:
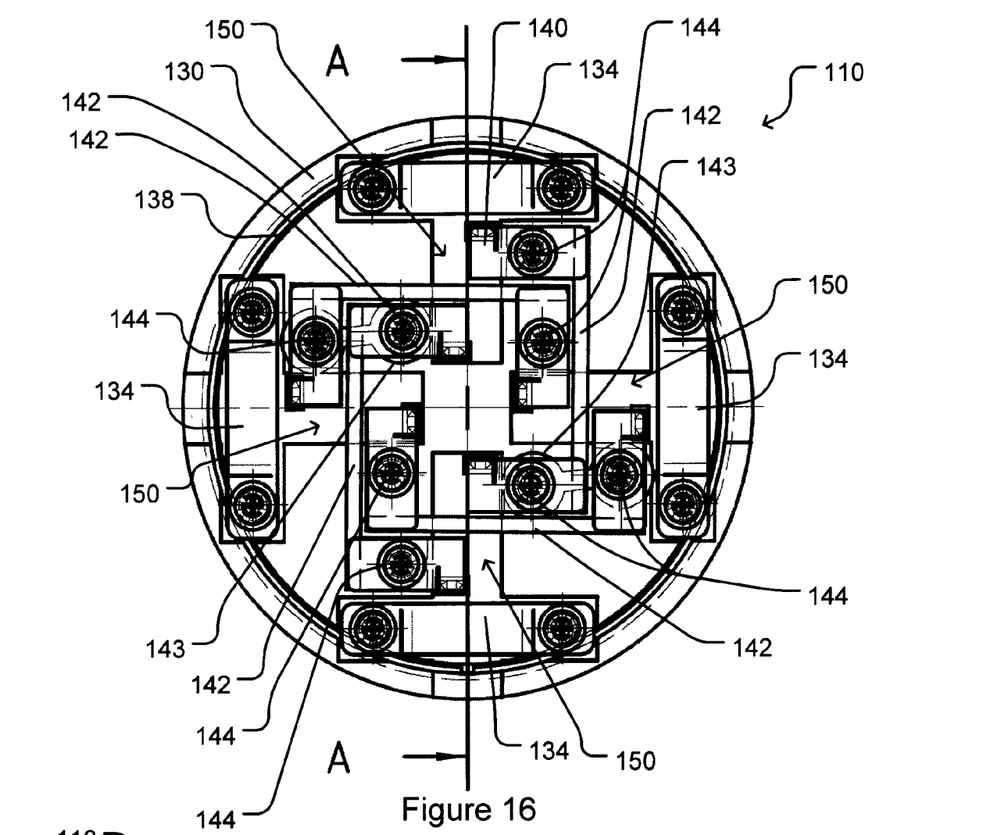
FIG. 16 is a top view of the cable connector assembly of FIG. 14.
Figure 17:
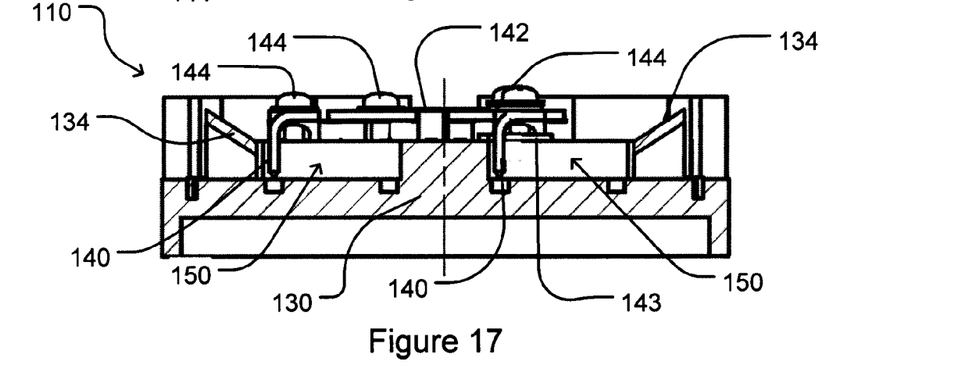
FIG. 17 is a sectional view taken along line A-A of FIG. 16.
Figure 18:
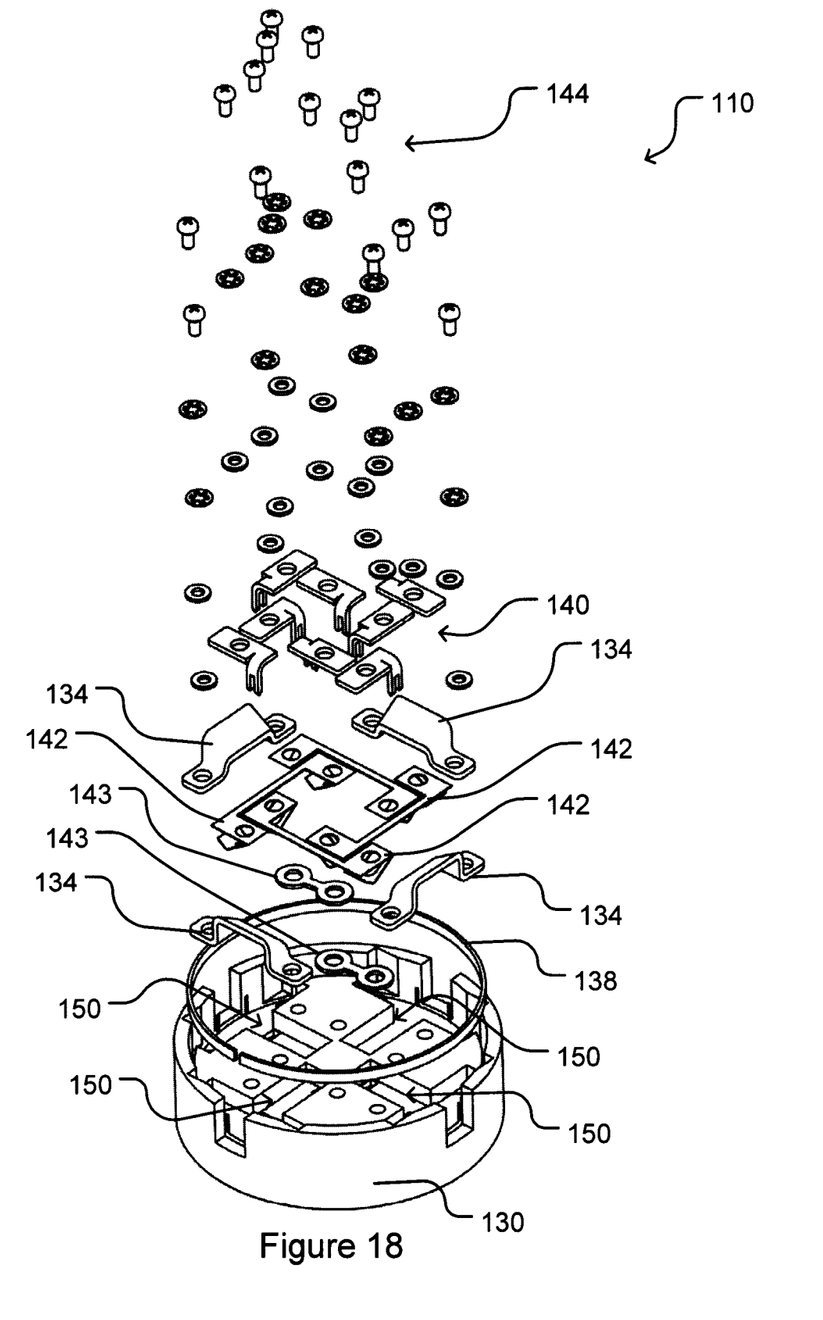
FIG. 18 is an exploded view of the cable connector assembly of FIG. 14.

Ground connectors comprising U-shaped members 134 are positioned at the entrances of channels 150. A ground ring 138 received in a slot in block 130 is in electrical contact with the ground connectors. Each U-shaped member 134 may be made from a flexible material such as thin steel. A grounding screw (not shown) coupled to a middle portion of U-shaped number 134 may be provided in some embodiments, or ground wires may be secured by the screws (not specifically enumerated) attaching U-shaped number 134 to block 30.

A pair of wire connectors 140 are mounted to block 130 on opposite sides of each channel 150. Wire connectors 140 comprise teeth positioned to be moved into and out of channels 150 to make electrical contacts with wires of cables received in channels 150. Leaf springs 142 positioned between wire connectors 140 and block 130 provide electrical connections between corresponding wire connectors 140 associated with opposing channels 150. Leaf springs 142 also keep wire connectors 140 out of channels 150 unless wire connector screws 144 are tightened to force wire connectors 140 into channels 150. Additional connector elements 143 may be provided under leaf springs 142 to provide electrical connections between corresponding wire connectors 140 associated with adjacent channels 150.

While a number of exemplary aspects and embodiments have been discussed above, those of skill in the art will recognize certain modifications, permutations, additions and sub-combinations thereof. For example:
 A single wire connector screw extending through block 30 could be used to adjust corresponding wire connectors 40 on the top and bottom teeth of block 30.
 Grommets 24 may be reusable. Alternatively, for permanent installations a permanent seal around the cables could be provided.
 Differently shaped insulating blocks may be provided which are configured for use with differently shaped housings or enclosures.

It is therefore intended that the following appended claims and claims hereafter introduced are interpreted to include all such modifications, permutations, additions and sub-combinations as are within their true spirit and scope.

What is claimed is:

1. A cable connector assembly comprising:
 an insulating block defining a plurality of cable receiving channels therein, each cable receiving channel having an entrance at a periphery of the insulating block;
 a plurality of ground connectors coupled to the insulating block, the ground connectors positioned such that a ground connector is located proximate to the entrance of each cable receiving channel, each ground connector comprising a U-shaped member for engaging a ground braid of a heating cable and a grounding screw for engaging a ground wire of a power cable;
 a ground linking structure electrically connecting the plurality of ground connectors;
 a plurality of first wire connectors adjustably coupled to the insulating block, the plurality of first wire connectors positioned such that a first wire connector is positioned to selectively extend into a first side of each cable receiving channel;
 a first wire linking structure electrically connecting the plurality of first wire connectors;
 a plurality of second wire connectors adjustably coupled to the insulating block, the plurality of second wire connectors positioned such that a second wire connector is positioned to selectively extend into a second side of each cable receiving channel; and,
 a second wire linking structure electrically connecting the plurality of second wire connectors.

2. A cable connector assembly according to claim 1 wherein the first wire linking structure and the second wire linking structure each comprise at least one leaf spring electrically connected between a pair of corresponding wire connectors associated with different cable receiving channels.

3. A cable connector assembly according to claim 2 wherein the leaf spring biases the wire connectors out of the cable receiving channels.

4. A cable connector assembly according to claim 3 comprising a wire connector screw for coupling each wire connector to the block, whereby the wire connector is urged into the associated cable receiving channels as the wire connector screw is tightened.

5. A cable connector assembly according to claim 4 wherein the leaf spring is held in electrical contact with the pair of wire connectors by the wire connector screws.

6. A cable connector assembly according to claim 4 wherein the leaf spring flexible to an extent such that the pair of wire connectors are maintained in a generally parallel relationship when one wire connector screw of the pair of wire connectors is tightened and the other wire connector screw is loosened.

7. A cable connector assembly according to claim 1 further comprising a housing defining a cavity therein sized to receive the insulating block.

8. A cable connector assembly according to claim 7 comprising removable top and bottom panels coupled to the housing.

9. A cable connector assembly according to claim 7 wherein the housing comprises threaded portions extending outwardly therefrom, the assembly further comprising end caps threadedly received on external threads of the threaded portions.

10. A cable connector assembly according to claim 9 wherein each threaded portion further comprises inner threads.

11. A cable connector assembly according to claim 9 wherein each end cap defines an aperture and each threaded portion comprises a tapered portion.

12. A cable connector assembly according to claim 11 further comprising a washer and a grommet associated with each end cap and having one or more cable apertures therethrough, the washer and grommet each having a cross section larger than the apertures of the end caps or the tapered portions of the threaded portions, such that the washer and grommet are securable between the end cap and the tapered portion.

13. A cable connector assembly according to claim 12 wherein the grommet is constructed of a compressible material such that tightening the end cap forms a seal between the grommet and one or more cables inserted through the one or more cable apertures.

14. A cable connector assembly according to claim 1 further comprising a spacing device insertable into one of the cable receiving channels for maintaining a first wire of a cable on the first side of the cable receiving channel and the second wire of the cable on the second side of the cable receiving channel.

15. A cable connector assembly comprising:
  an insulating block defining a plurality of cable receiving channels therein, each cable receiving channel having an entrance at a periphery of the insulating block;
  a plurality of ground connectors coupled to the insulating block, the ground connectors positioned such that a ground connector is located proximate to the entrance of each cable receiving channel;
  a ground linking structure electrically connecting the plurality of ground connectors;
  a plurality of first wire connectors adjustably coupled to the insulating block, the plurality of first wire connectors positioned such that a first wire connector is positioned to selectively extend into a first side of each cable receiving channel;
  a first wire linking structure electrically connecting the plurality of first wire connectors;
  a plurality of second wire connectors adjustably coupled to the insulating block, the plurality of second wire connectors positioned such that a second wire connector is positioned to selectively extend into a second side of each cable receiving channel; and,
  a second wire linking structure electrically connecting the plurality of second wire connectors,
wherein the first wire linking structure and the second wire linking structure each comprise at least one leaf spring electrically connected between a pair of corresponding wire connectors associated with different cable receiving channels.

* * * * *